United States Patent [19]

Chiri et al.

[11] Patent Number: 4,899,720
[45] Date of Patent: Feb. 13, 1990

[54] MACHINE FOR CUTTING STONE MATERIALS

[75] Inventors: Chiaffredo Chiri, Via Longoria, 5, 10026 Santena; Pierino Gianoglio, Fossano; Claudio Giraudo, Cuneo; Sergio Marengo, Fossano; Giovanni Zaino, Viale Stazione, 6, 12032 Barge, all of Italy

[73] Assignees: Tecno-Sameg S.r.L.; Chiaffredo Chiri; Giovanni Zaino, all of Italy

[21] Appl. No.: 218,674

[22] Filed: Jul. 13, 1988

[30] Foreign Application Priority Data

Jul. 14, 1987 [IT] Italy ............................... 67607 A/87

[51] Int. Cl.⁴ ............................................. B28D 1/08
[52] U.S. Cl. ..................................... 125/21; 83/639.5; 83/796
[58] Field of Search ...................... 125/19, 21; 83/639, 83/794, 796, 801, 804, 810

[56] References Cited

U.S. PATENT DOCUMENTS

| | | | |
|---|---|---|---|
| 2,430,160 | 11/1947 | Criner | 125/21 |
| 2,855,043 | 10/1958 | Opferkuch | 125/21 |
| 3,465,628 | 9/1969 | Komendowski et al. | 83/639 |
| 4,004,480 | 1/1977 | McCabe | 83/639 |
| 4,479,410 | 10/1984 | Toguchi | 83/796 |

Primary Examiner—Judy Hartman
Attorney, Agent, or Firm—Kane, Dalsimer, Sullivan, Kurucz, Levy, Eisele and Richard

[57] ABSTRACT

A machine for cutting a block of stone material into slabs, comprising a bandsaw provided with a blade movable along a plane of cut and a carriage able to support the block and to cause its approach motion towards the blade. This blade passes over two flywheels one of which is driven, mounted on a body which is oscillatable with respect to a base of the saw; the body is provided with a template cooperating with an inclined plane fixed to the base and is alternately movable on this under the thrust of a pair of hydraulic actuators.

8 Claims, 4 Drawing Sheets

MACHINE FOR CUTTING STONE MATERIALS

BACKGROUND OF THE INVENTION

The present invention relates to a machine for cutting blocks of stone materials into slabs.

Machines of the said type are known, comprising a bandsaw and a carriage acting to support a block and to cause it to move progressively towards the saw blade, which therefore sinks progressively into the block along a plane of cut.

The carriage normally includes an oscillating table acting to impart to the block an oscillatory movement with respect to the blade; the composition of the motions of approach and oscillation cause contact between the block and the blade along a substantially rectilinear cutting face the extent of which increases as the axis of oscillation of the block approaches closer to the blade and, in any case, is equal to a considerable fraction of the thickness of the block. This involves high cutting forces and rapid wear of the blade, with consequent high operating and maintenance costs.

There are likewise known machines in which, for the purpose of reducing the cutting face, the saw is provided with a body movable in a vertical direction and with corresponding movement means. Such machines have, however, a particularly massive structure and involve high manufacturing and servicing costs.

SUMMARY OF THE INVENTION

The object of the present invention is that of providing a machine for cutting blocks of stone materials into slabs, which will be free from the disadvantages connected with the above specified machines of known type.

The said object is achieved by the present invention in that it relates to a machine for cutting blocks of stone materials along a plane of cut, of the type comprising a carriage acting to carry the block and to translate in a direction parallel to the said plane of cut, and a bandsaw comprising a support body, a pair of fly-wheels, one of which is driven, mounted on the said body, and a band blade passing over the said fly-wheels and movable along the said plane of cut, the said body and the said carriage being provided with a relative oscillatory motion parallel to the said plane of cut, characterised by the fact that the said relative oscillatory motion consists in a rotation about an instantaneous axis of rotation perpendicular to the said plane of cut, the said instantaneous axis of rotation being disposed at least at a predetermined distance from the said blade and independently of the position of the said carriage.

BRIEF DESCRIPTION OF THE DRAWINGS

For a better understanding of the present invention several preferred embodiments will now be described, purely by way of non-limitative example, with reference to the attached drawings, in which.

DETAILED DESCRIPTION OF THE INVENTION

Figure 1:
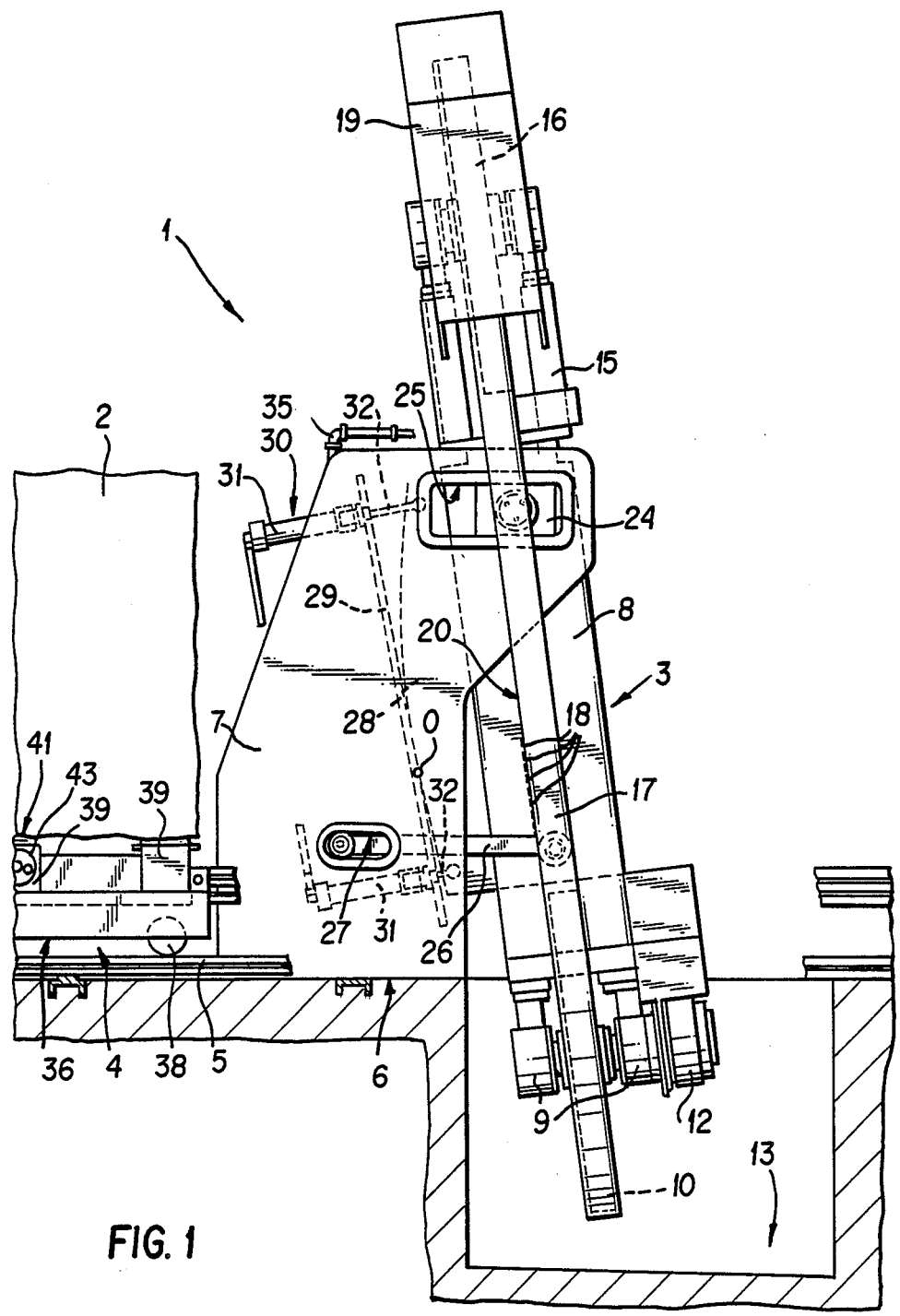
FIG. 1 is a partial side view of a machine for cutting blocks of stone material formed according to the principles of the present invention.
Figure 2:
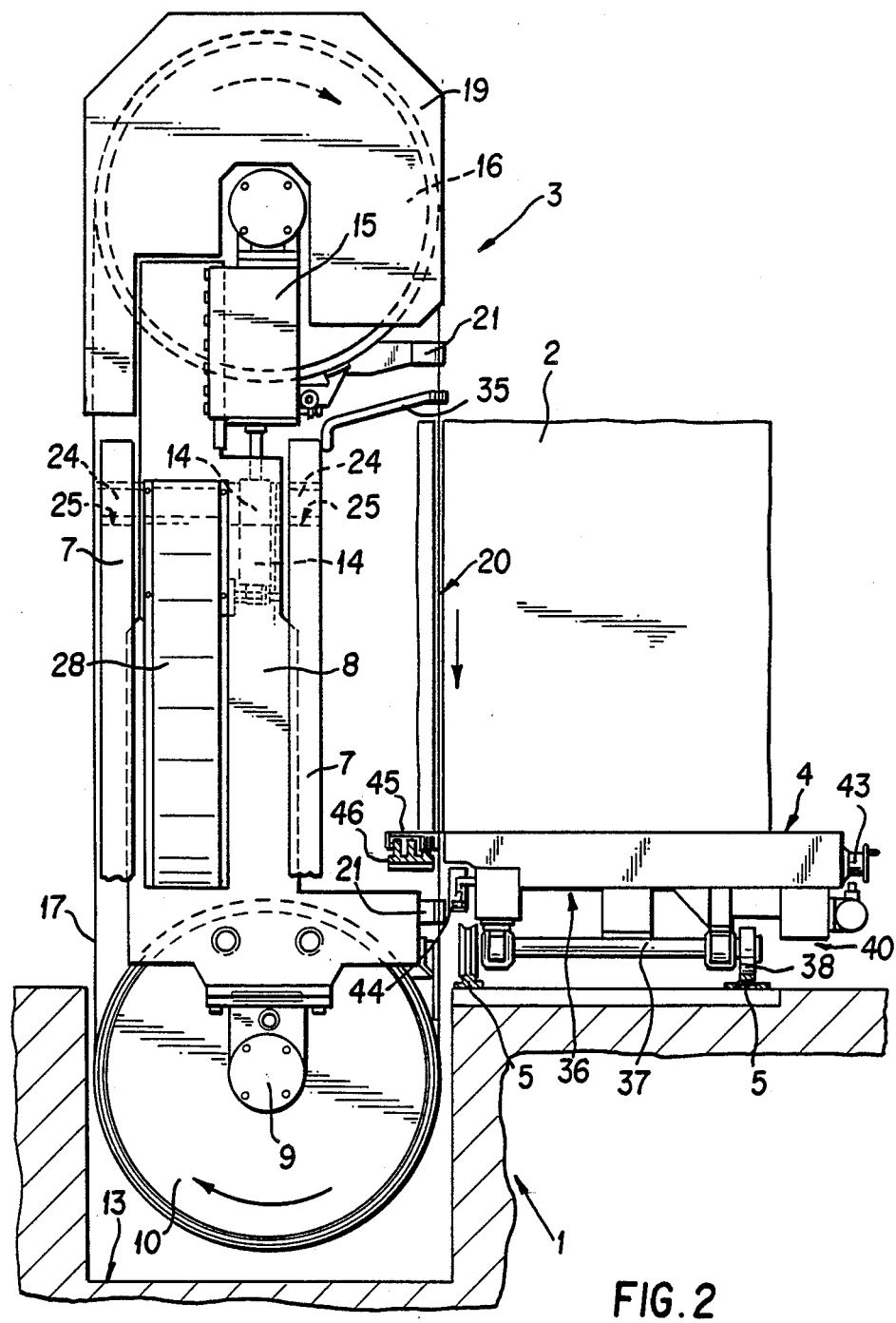
FIG. 2 is a partial front view of the machine of FIG. 1.

With reference to FIGS. 1 and 2, a machine for cutting a block 2 of granite is generally indicated with the reference numeral 1.

The machine 1 comprises a bandsaw 3 and a carriage 4 for supporting the block 2 and displaceable on a pair of rails 5 disposed alongside the saw 3.

The saw 3 includes a fixed base 6 provided with two vertical sides 7 parallel to one another and to the said rails 5, between which a vertically elongated body 8 is mounted in an oscillating manner; at a lower end of the body 8 there is fixed, by conventional support means 9, a driving fly-wheel 10 angularly coupled to an hydraulic motor 12. For the purpose of limiting the height of the saw 3 above ground the fly-wheel 10 is at least partly housed in a pit 13 excavated in the ground. On an upper end of the body 8 there is longitudinally slidable, under the thrust of an hydraulic actuator 14, a slide 15 on which is freely rotatably mounted a second fly-wheel 16 the axis of which is parallel to the axis of the driving fly-wheel 10. Over the said fly-wheels 10, 16 there passes, in the manner of a transmission belt, a blade 17 of known type constituted substantially by a metal band provided with a plurality of cutting diamonds 18 carried, and maintained under tension, by the actuator 14. A protective hood 19 is disposed around the freely rotatable fly-wheel 16.

The blade 17 defines, with its active limb 20 facing the carriage 4, a vertical plane of cut parallel to the rails 5 as well as to the plane defined by the axes of the fly-wheels 10, 16.

The blade 17 is guided in a known way at the ends of the active limb 20 by blade guide elements 21 of conventional type fixed to the body 8.

According to the present invention the body 8 is fixed to each of the lateral side walls 7 at the top by a slide block 24 pivoted onto the body 8 and slidable along a respective horizontal seat 25, and at the bottom by a link 26 pivoted at one end to the body 8 itself and slidably mounted at its other end in a second horizontal seat 27. On the body 8 is fixed a template 28 of convex cylindrical profile which cooperates with an inclined plane 29 laterally welded between the side walls 7. The contact between the template 28 and the inclined plane 29 is maintained by a pair of hydraulic actuators 30 the cylinders 31 of which are pivotally connected to the inclined plane 29 close to the upper and lower ends thereof, and the pistons 32 of which are pivotally connected to the template 28 fixed to the body 8. The saw 3 is finally provided with a lubricating and cooling system for the blade 17, of conventional type, of which a tube 35 for introduction of a cooling lubricant to the active limb 20 of the blade 17 is visible immediately upstream of the cutting region. The direction of rotation, in use, of the fly-wheels 10, 16 and the blade 17 is indicated with arrows in FIG. 2.

A carriage 4, known per se, is composed substantially of a metal structure 36 on the underside of which are mounted two freely rotatable axles 37 provided with wheels 38 able to roll on the rails 5. On the structure 36 there are disposed cross members 39 which act as supports for the block 2; at least two of the cross members 39 are provided with an hydraulic device 40 of conventional type which allows the block 2 to be raised, and a mechanical device 41, for example of the screw type, manually controllable by means of a hand wheel 43 and operable to cause transverse translation of the block 2 with respect to the carriage 4.

The carriage 4 is drawn along the rails 5 by a chain traction device 44 operated in a conventional manner by an electric motor not illustrated. An auxiliary carriage 45 is slidable on a railway track 46 parallel to the rails 5 and alongside an upper support plane of the carriage 4 at a distance from this latter sufficient to permit the passage of the blade 17. The auxiliary carriage 45 can be fixed to the carriage 4 by manual engagement means not illustrated.

The operation of the machine 1 is as follows.

The block 2 is loaded onto the carriage 4 and positioned by means of the devices 41 in such a way that a portion of predetermined width rests on the auxiliary carriage 45 which, in this working phase is fixed to the carriage 4. The carriage 4 is then caused to advance towards the saw 3 in such a way as to carry the block 2 into contact with the blade 17.

At the same time the body 8 of the saw is provided with an oscillatory motion with respect to the base 6 under the reciprocating thrust of the actuators 30. The motion which results is substantially determined by a reciprocating rolling of the template 28 on the inclined plane 29; the body 8 therefore rotates about a fictitious or virtual movable axis O orthogonal to the plane of cut and coincident, instant by instant, with the generatrix of contact between the template 28 and the inclined plane 29, and is guided in this motion by the slide block 24 and the link 26. The composition of the approach motion of the carriage 4 and the motion of the body 8 of the saw 3 causes a cutting configuration which could be defined as an "envelope" in that the blade 17 attacks the block 2 with a continuously variable angular disposition between two limit positions corresponding to the end of stroke conditions of the two actuators 30; these limit positions, in the illustrated example, correspond to an inclination of the body 8 respectively of about 7° and about 19° with respect to the vertical. It is observed that the actuators 30 move in a reciprocating manner in that the respective actuating pressures vary in time with phase displaced cycles; in particular, both the actuators 30 exert on the template 28 variable traction forces the resultant of which has a sufficient intensity to maintain the template 28 itself in contact with the inclined plane 29.

At the end of the cutting phase a slab 48 is obtained which rests on the auxiliary carriage 45; the carriage 4 and the auxiliary carriage 45 are then separated. The carriage 4 is returned back to its position at the commencement of the cycle; the carriage 45 is manually displaced towards a slab off-loading station not illustrated and then taken back alongside the carriage 4 and coupled to it. The block 2 is again positioned as described at the commencement of the cycle and the new cycle can commence. It is apparent that the thickness of the slab depends on the transverse advance given to the block 2 by the devices 41.

Figure 3:
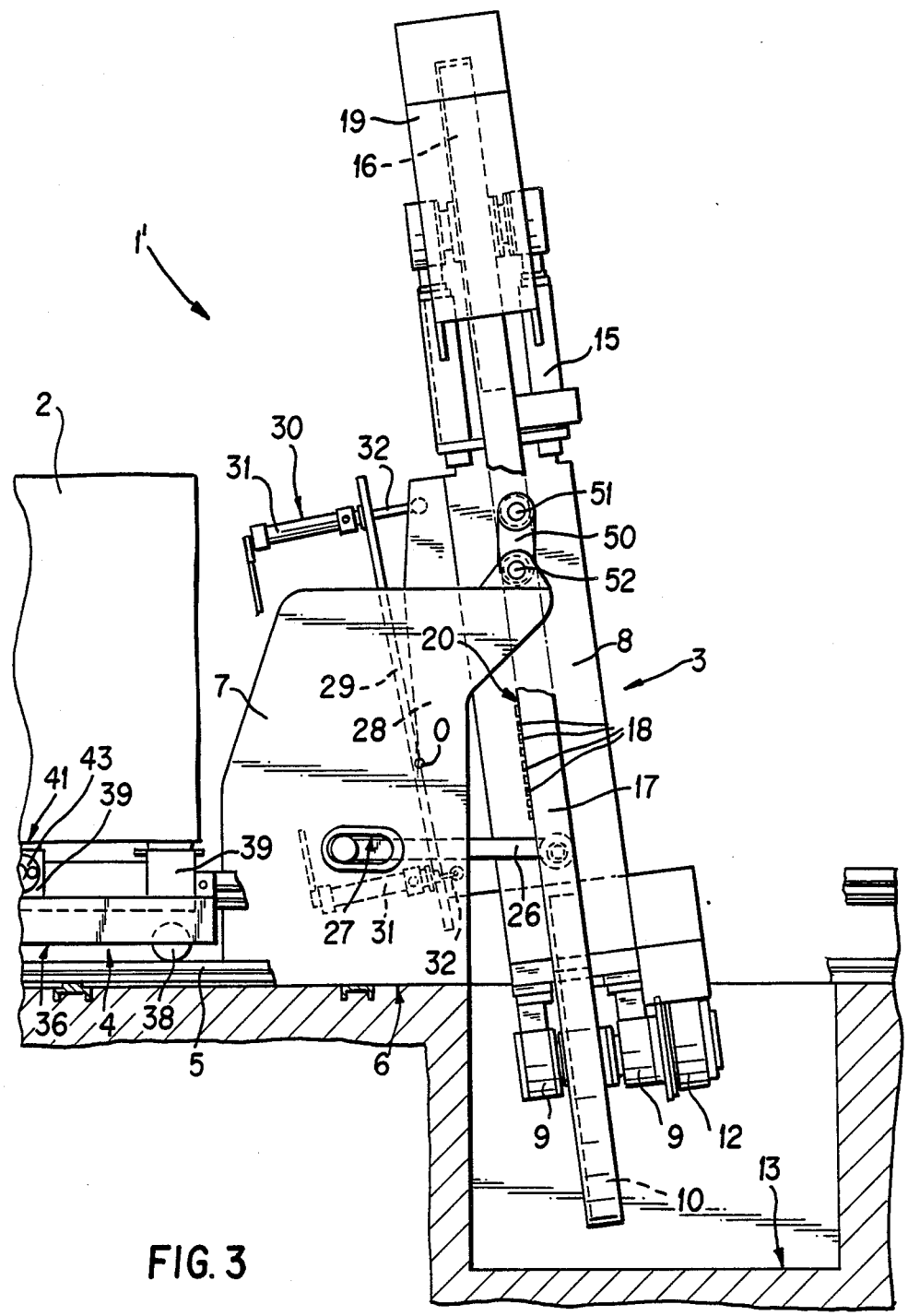
FIG. 3 is a partial side view of a second embodiment of a machine according to the present invention.

The machine 1' illustrated in FIG. 3, in that it is very similar to the machine 1, is described herein only as far as it differs, utilising the same reference numerals to indicate the same parts as those already described with reference to FIGS. 1 and 2. The machine 1' differs from the machine 1 only by the manner in which the body 8 of the saw 3 is attached to the side walls 7. In this case the slide blocks 24 are replaced by cranks 50 which are articulated to the body 8 by means of a pin 51, which can be a single pin common to the two cranks 50, and to the side wall 7 by means of respective pins 52. The operation in use is identical to the machine 1 except for the fact that the point of attachment of the body 8, that is to say the pin 51, displaces along a circular trajectory centred on the axes of the pins 52 whilst in the machine 1 the slide blocks 24 are constrained to follow a rectilinear trajectory.

Figure 4:
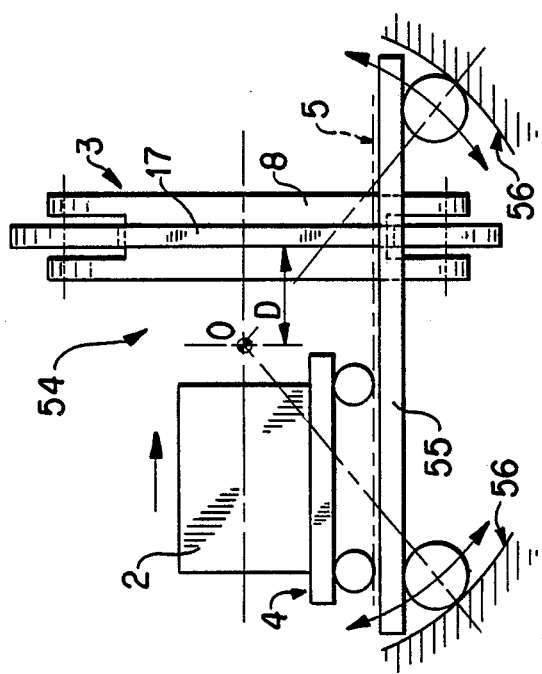

FIG. 4 illustrates a diagram of a third embodiment of a machine according to the present invention. The machine, indicated in this case with the numeral 54, comprises a saw 3 having a body 8 fixed, for example, in a vertical position; the rails 5 on which the carriage 4 rolls are mounted on a support element 55 oscillating on cylindrical guides 56 the axis of curvature O of which, which in use constitutes the axis of the relative oscillatory motion between the block 2 and the blade 17 of the saw 3, is conveniently disposed on a horizontal median plane of the block 2, at a predetermined distance D from the blade 17. The operation of the machine 54 is substantially similar to that of the machine 1. From a kinematic point of view the oscillatory motion and the approach motion are both accomplished by the support means 55 and 4 of the block 2, whilst the blade 17 is fixed; moreover, the relative oscillatory motion is a rotation about a fixed axis.

Figure 5:
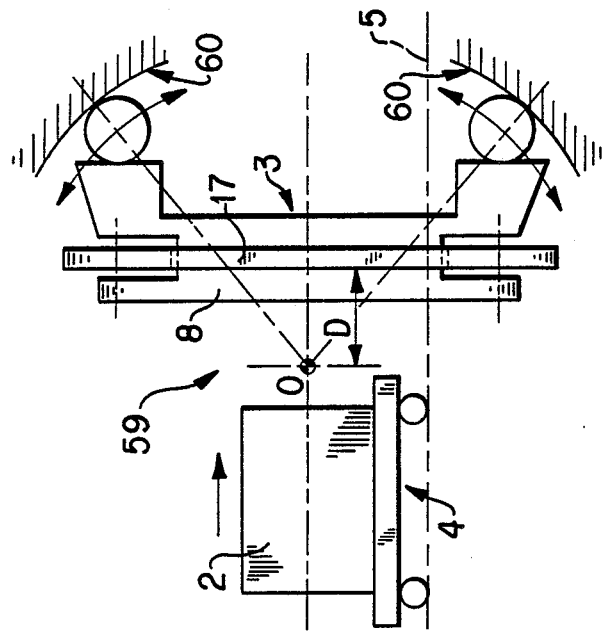
FIGS. 4 and 5 schematically illustrate two further embodiments of the present invention.

FIG. 5 illustrates a diagram of a fourth embodiment of a machine according to the present invention. The machine, now indicated with the reference numeral 59, includes a carriage 4 which can roll on fixed rails 5, and a saw 3 the body 8 of which is oscillatable on cylindrical guides 60 the axis of curvature O of which, which in use constitutes the axis of the relative oscillatory motion between the block 2 and the blade 17 of the saw 3, is conveniently disposed on a horizontal median plane of the block 2 at a predetermined distance D from the blade 17. The operation of the machine 59 is similar to that of the machine 54; from a kinematic point of view the difference lies in the fact that in this case the carriage 4 is provided only with the approach motion whilst the relative oscillatory motion is performed by the body 8 of the saw 3.

From a study of the characteristics of the machines 1, 1', 54 and 59 formed according to the present invention the advantages which these allow to be obtained are evident.

First of all the relative oscillatory motion of the blade 17 with respect to the block 2, in combination with the approach motion of the block 2, causes a cutting of the block itself along continuously variable cutting faces of reduced width, therefore considerably improving the operating conditions; in particular, the cutting force, and therefore the power required, is reduced and consequently the service life of the blade 17 is increased. Moreover, since the axis O of the oscillatory motion, whether it be fixed or movable, is not displaced with the block 2 but is in any case disposed at a minimum predetermined distance from the blade 17, the cutting conditions are not varied during the advance of the block 2 with respect to the blade 17 and, in particular, the width of the cutting face is not progressively increased but remains substantially constant for the whole of the cut.

Finally, it is clear that the machines 1, 1', 54 and 59 illustrated here can have modifications and variations introduced thereto without by this departing from the protective ambit of the present invention.

We claim:

1. A machine for cutting blocks of stone material along a plane of cut, comprising:

a carriage acting to carry a block of said stone material;

a bandsaw (3) having a support body (8);

a pair of fly-wheels mounted on said support body, one of which is driven; and a band blade passing over said fly-wheels and movable along said plane of cut, said carriage acting to translate in a direction parallel to said plane of cut to bring said block into contact with said blade and effect a cutting phase; and reciprocating means for producing an oscillatory relative motion between said body and said carriage, said motion being parallel to said plane of cut and consisting in a plurality of rotatatory oscillations during said cutting phase about an instantaneous axis of rotation (O), said instantaneous axis of rotation being disposed at a location which is a predetermined distance from said blade independently of the position of said carriage, means cooperable between said body and said base for moving the location of the axis of rotation.

2. A machine according to claim 1, characterised by the fact that the said axis (O) is a virtual axis.

3. A machine according to claim 1, characterised by the fact that the said body (8) of the said saw (3) is movable and comprises a portion (28) of convex profile cooperable with an abutment surface (29) fixed to a fixed base (6) of the said saw (3); the said axis of rotation (O) being instant by instant coincident with a generatrix of contact between the said portion (28) of convex profile and the said abutment surface (29).

4. A machine according to claim 3, characterised by the fact that said reciprocating means comprises a pair of hydraulic actuators (30) secured to the said portion (28) of convex profile and to the said abutment surface (29), operable to maintain the said portion (28) of convex profile in contact with the said abutment surface (29) and to be actuated reciprocally to cause the oscillatory motion of the said body (8) of the said saw (3) with respect to the said base (6).

5. A machine according to claim 3 characterised by the fact that the said portion (28) of convex profile has a cylindrical profile and the said abutment surface (29) is an inclined plane.

6. A machine according to claim 3, further comprising means (24, 26, 50) for guiding said body (8) with respect to the said base (6).

7. A machine according to claim 6, characterised by the fact that the said guide means comprise at least one slide block (24) and a link (26).

8. A machine according to claim 6, characterised by the fact that the said guide means include at least one crank (50) and a link (26).

* * * * *